United States Patent
Caponetti et al.

(10) Patent No.: US 10,907,617 B2
(45) Date of Patent: Feb. 2, 2021

(54) DIAGNOSTIC SYSTEM AND METHOD FOR USE IN A WIND TURBINE

(71) Applicant: VESTAS WIND SYSTEMS A/S, Aarhus N (DK)

(72) Inventors: Fabio Caponetti, Åbyhøj (DK); Martin Ansbjerg Kjaer, Harlev J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/313,961

(22) PCT Filed: Jun. 29, 2017

(86) PCT No.: PCT/DK2017/050217
§ 371 (c)(1),
(2) Date: Dec. 28, 2018

(87) PCT Pub. No.: WO2018/001432
PCT Pub. Date: Jan. 4, 2018

(65) Prior Publication Data
US 2019/0219033 A1    Jul. 18, 2019

(30) Foreign Application Priority Data

Jun. 30, 2016 (DK) .................................. 2016 70479

(51) Int. Cl.
*F03D 17/00* (2016.01)
*F03D 7/02* (2006.01)
(Continued)

(52) U.S. Cl.
CPC ........... *F03D 17/00* (2016.05); *F03D 7/0204* (2013.01); *F03D 7/047* (2013.01); *F03D 80/50* (2016.05);
(Continued)

(58) Field of Classification Search
CPC ...... F03D 17/00; F03D 80/50; F05B 2260/80; F05B 2260/98
(Continued)

(56) References Cited

U.S. PATENT DOCUMENTS

| 4,420,692 A | * | 12/1983 | Kos | ........................ F03D 7/0224 290/44 |
| 2008/0206051 A1 | * | 8/2008 | Wakasa | ................... F03D 7/043 416/41 |

(Continued)

FOREIGN PATENT DOCUMENTS

| CN | 101469670 A | 7/2009 |
| CN | 101660493 A | 3/2010 |

(Continued)

OTHER PUBLICATIONS

Chinese Office Action for applicaion No. 201780052788.2 dated Dec. 4, 2019.

(Continued)

*Primary Examiner* — Md Azad
(74) *Attorney, Agent, or Firm* — Patterson + Sheridan, LLP

(57) ABSTRACT

A diagnostic system for use in a wind turbine yaw system, comprising: a tower motion sensor configured to output a signal indicative of tower oscillation, in particular though not exclusively side to side tower oscillation, and a diagnostic module configured to: analyse the tower motion sensor signal to identify frequency content of the signal that is not associated with the tower oscillation; and correlate the identified frequency content with the operation of the yaw system thereby to determine that the yaw system requires maintenance. Beneficially the invention provides that the health of the yaw system can be determined by analysing the oscillatory movement of the tower as measured by a tower (Continued)

motion sensor installed at a suitable location for example at the top of the tower or in the nacelle for example.

16 Claims, 4 Drawing Sheets

(51) Int. Cl.
*F03D 80/50* (2016.01)
*F03D 7/04* (2006.01)

(52) U.S. Cl.
CPC ..... *F05B 2260/80* (2013.01); *F05B 2260/964* (2013.01); *F05B 2260/98* (2013.01); *Y02E 10/72* (2013.01)

(58) Field of Classification Search
USPC ........................................................ 700/287
See application file for complete search history.

(56) References Cited

U.S. PATENT DOCUMENTS

| | | | | |
|---|---|---|---|---|
| 2009/0081026 A1* | 3/2009 | Demtroder | ............. | F03D 80/00 415/118 |
| 2009/0292397 A1* | 11/2009 | Bjerge | ................. | F03D 7/0272 700/280 |
| 2013/0110414 A1* | 5/2013 | Caponetti | ................. | F03G 7/00 702/35 |
| 2014/0339827 A1* | 11/2014 | Esbensen | ............. | F03D 7/0296 290/44 |
| 2017/0234304 A1* | 8/2017 | Sakaguchi | ................ | F03D 9/25 73/112.01 |

FOREIGN PATENT DOCUMENTS

| | | |
|---|---|---|
| CN | 104153949 A | 11/2014 |
| EP | 1531376 A1 | 5/2005 |
| EP | 2154362 A1 | 2/2010 |
| EP | 2522977 A1 | 11/2012 |
| GB | 2491983 A | 12/2012 |
| JP | 2016030147 A | 3/2016 |
| WO | 2011060424 A1 | 5/2011 |
| WO | 2018001432 A1 | 1/2018 |

OTHER PUBLICATIONS

PCT Written Opinion of the International Searching Authority for Application No. PCT/DK2017/050217.
Danish Patent and Trademark Office First Technical Examination for Application No. PA 2016 704079 dated Jan. 31, 2017.
PCT International Search Report for Application No. PCT/DK2017/050217.

* cited by examiner

DIAGNOSTIC SYSTEM AND METHOD FOR USE IN A WIND TURBINE

TECHNICAL FIELD

The present invention relates to a diagnostic system for a wind turbine control system and also to a method of operating a diagnostic system to validate a motion sensor signal that is indicative of side-to-side tower oscillation of the wind turbine system.

BACKGROUND TO THE INVENTION

Wind turbines generally take the form of tall slender structures comprising a nacelle mounted on top of a tower, the nacelle carrying the rotor of the wind turbine. As with all tall slender structures, the tower has a tendency to sway in use.

The tower may oscillate in a predominantly side-to-side motion in accordance with its natural frequency (or 'eigenfrequency'), which is determined largely by features of the tower such as its height, diameter, material of fabrication, internal structure, torsional stiffness, nacelle mass and so on. Large oscillations may also be caused by the dynamic load generated due to the motion of the rotor which is mounted to the nacelle of the wind turbine, which is typically designed to rotate at a predetermined rotational speed or angular frequency, which is commonly referred to as the 1P frequency.

The large side-to-side oscillations generate significant stresses through the tower that, over time, can affect its structural integrity. Modern wind turbine systems utilise tower motion damping systems to counteract the motion of the tower. Such tower motion damping systems actively adjust the power electronics of the turbine in order to control the generator torque. They also act through a pitch control system to control the pitch angle of the blades (either individually or collectively). However, tower motion damping systems rely heavily on measuring the oscillations accurately, typically through the use of a tower motion sensor located either in the nacelle or at the top of the tower.

Since the effectiveness of the tower motion damping system, and indeed other wind turbine systems, relies on the accuracy of the acceleration signal provided by the tower motion sensor, it is important to ensure that the system can determine whether the acceleration signal can be relied upon. It is against this background that the invention has been devised.

SUMMARY OF THE INVENTION

Against this background the invention provides a diagnostic system for use in a wind turbine yaw system, comprising: a tower motion sensor configured to output a signal indicative of tower oscillation, in particular though not exclusively side to side tower oscillation, and a diagnostic module configured to: analyse the tower motion sensor signal to identify frequency content of the signal that is not associated with the tower oscillation; and correlate the identified frequency content with the operation of the yaw system thereby to determine that the yaw system requires maintenance.

The invention may also be expressed as a method of validating a tower motion sensor signal indicative of tower oscillation of a wind turbine system, the method including: analysing the tower motion sensor signal to identify frequency content that is not associated with the tower oscillation; and correlating the identified frequency content with the operation of the yaw system thereby to determine that the yaw system requires lubrication.

Beneficially the invention realises that the health of the yaw system can be determined by analysing the oscillatory movement of the tower as measured by a tower motion sensor installed at a suitable location for example at the top of the tower or in the nacelle for example. Suitably, the tower motion may be side-to-side tower motion as measured by a suitable accelerometer or other sensors such as a gyroscope or magnetometer. In another sense, therefore, the system can be considered to be a diagnostic system which is configured to identify that the yaw system has a requirement for maintenance.

Further, the diagnostic module may be configured to: identify a first portion of the frequency content that is indicative of tower oscillation and a second portion that is indicative of the operation of the yaw system; and generate an error signal in dependence on the detection of the second portion of the signal, wherein the second portion of the frequency content has a frequency that is outside the sensitivity range of the motion sensor.

Various techniques may be used to achieve this. For example, the diagnostic system may implement a statistical change detection algorithm to analyse the tower motion signal, wherein the tower motion signal is analysed to detect changes in a mean value thereof from an idealised mean value. Alternatively, the diagnostic module may implement a power spectrum analysis algorithm to analyse the tower motion signal, so as to identify increases in power at one or more frequencies of interest that are indicative of lack of lubrication of the yaw system and, thus, the need for maintenance.

The diagnostic system may further comprise an error handing module configured to trigger an error handling event in dependence on receiving the error signal, wherein the error handling event comprises performing any one of: a) logging the error signal, b) providing an alert to an external operator, and c) deactivate a tower motion damping system of the wind turbine. The external operator may be a transmission system operator, which may need such information so that it can take appropriate action, or the operator may be a maintenance system which flags that the yaw system requires a different or enhanced maintenance regime. The error signal may be maintained as active for a predetermined holding period to ensure that the signal is acted upon and not overlooked.

The embodiments of the invention find particular utility with motion sensors of a low sensitivity such that high frequency vibrations of the yaw system, indicative of the need for maintenance, may mask the signal content providing the tower oscillation information.

The invention may also be expressed as a computer program product downloadable from a communication network and/or stored on a machine readable medium, comprising program code instructions for implementing a method as described above.

BRIEF DESCRIPTION OF THE DRAWINGS

In order for the invention to be more fully understood, it will now be described by way of example only with reference to the following drawings, in which.

DETAILED DESCRIPTION OF EMBODIMENTS OF THE INVENTION

Figure 1:
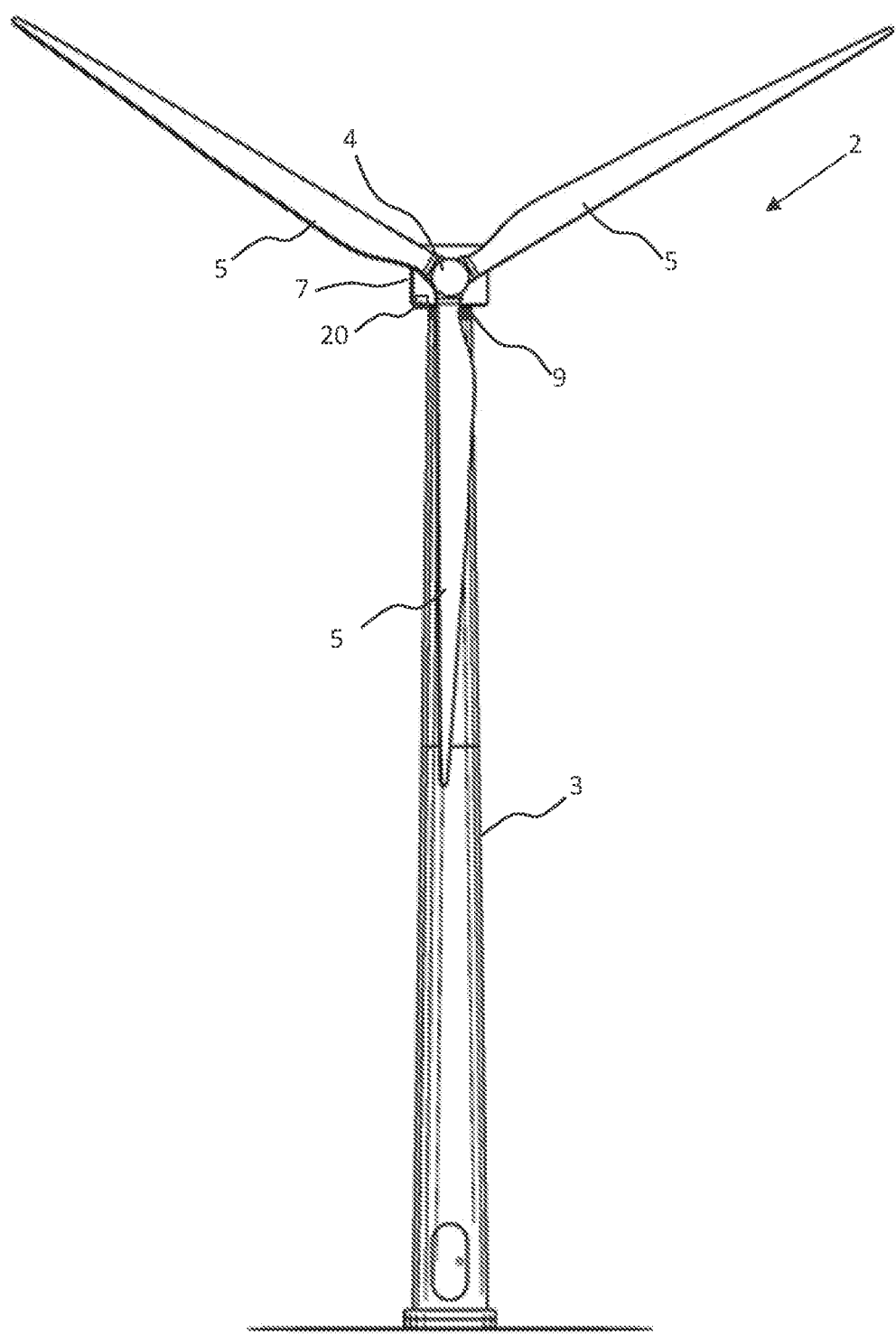
FIG. 1 is a view of a wind turbine system.
Figure 2:
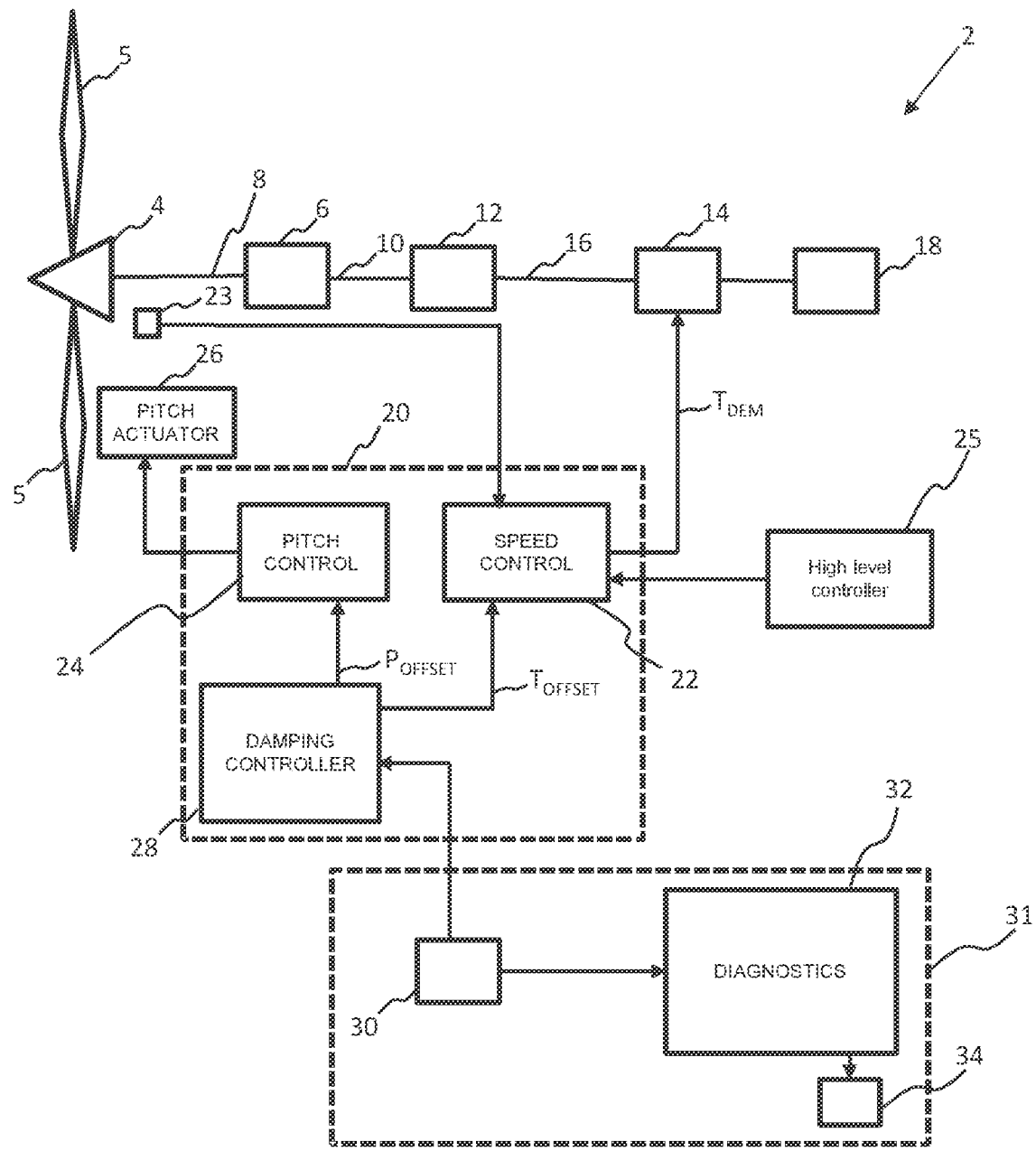
FIG. 2 is a schematic view of the wind turbine system shown in FIG. 1.

FIGS. 1 and 2 show schematic views of a wind turbine system 2. Each figure describes features that are significant for this discussion, although it should be appreciated that many features that are common to wind turbines are not shown here for brevity, for example the wind turbine control network, power distribution network and so on. However, the skilled person would understand that these features are implicitly present in a conventional wind turbine system as described herein.

With reference firstly to FIG. 1, the wind turbine system 2 includes a nacelle 7 mounted on top of a tower 3. The nacelle 7 is rotatable about the vertical of the tower 3 thereby defining a yawing motion of the nacelle 7 with respect to the tower 3. A rotor 4 comprising a set of blades 5 is mounted to the nacelle 7 in the usual way.

The wind turbine system 2 may further include an active yaw system (not shown), which is provided to rotate the nacelle 7 against the stationary tower 3. The active yaw system includes a means of rotatable connection between the nacelle 7 and the tower 3 (a yaw bearing), a means of active variation of the rotor orientation (a yaw drive), a means of restricting the rotation of the nacelle (yaw brake) and a yaw control system which is configured, in use, to automatically rotate the nacelle 7 in dependence on receiving an input signal from a wind direction sensor, for example. Alternatively, the active yaw system 7 may control the rotation of the nacelle 7 in response to receiving a demand from a wind control system 20 of the wind turbine.

The yaw bearing includes a sliding interface 9 between the nacelle 7 and the tower 3. In particular, a portion of that sliding interface 9 is defined by an upper surface of the tower 3 which is opposed to a second portion of the interface 9 on the underside of the nacelle 7. The sliding interface is lubricated so as to enable the nacelle 7 to freely rotate with respect to the tower 3 during operation of the wind turbine system 2.

With reference to FIG. 2, the wind turbine system 2 includes the rotor 4 which drives a gearbox 6 by way of an input shaft 8. Note that although a gearbox 6 is shown here, it is also known for wind turbines to have a direct-drive architecture in which a gearbox is omitted. The gearbox 6 has an output shaft 10 which drives a generator 12 for generating electrical power. Three phase electrical power generation is usual in utility scale wind turbine systems, but this is not essential for the purpose of this discussion.

The generator 12 is connected to a frequency converter 14 by a suitable three-phase electrical connector such as a cable or bus 16. The frequency converter 14 is of conventional architecture and, as is known, converts the output frequency of the generator 12 to a voltage level and frequency that is suitable for supplying to the grid 18. Various frequency converter architectures are known in the art and the particular type selected is not central to the invention and so will not be described here in detail.

Although fixed-speed wind turbines are appropriate for wind turbines having a comparatively low power output, for example of below 1 MW, in this embodiment the wind turbine system 2 is able to operate at variable speed so as to be more efficient at capturing energy from the wind at a wind range of wind speeds.

As is known, variable-speed wind turbines typically operate under two main control strategies: below-rated power and above-rated power. As is known, the term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

Below rated power occurs at wind speeds between the cut-in speed and rated wind speed which, typically, is between 10 and 17 $ms^{-1}$. In this operating region, the wind turbine system 2 is operable to control the rotor speed so as to maximise the energy captured from the wind. This is achieved by controlling the rotor speed so that the tip speed ratio is at an optimum value, namely between 6 and 7. To control the rotor speed, the wind turbine system 20 is provided with the facility to control the generator torque to track a commanded power reference.

Above-rated power occurs when the wind speed has increased to, or has exceeded, the rated wind speed. In this operating condition, the objective of the wind turbine system 2 is to maintain a constant output power. This is achieved by controlling the generator torque or power to be substantially constant, but varying the pitch angle of the blades which adjusts the resulting drag and lift forces in the rotor plane. This will slow down the turbine's rotational speed or the torque transferred to the rotor shaft so that the rotational speed or the torque is kept constant below a set threshold.

Referring again to FIG. 2, in order to achieve the below-rated power and above-rated power control objectives, the control system 20 comprises a speed controller 22 which is operable to control the frequency converter 14 to influence the torque exerted on the rotor 4 by the generator 12. The control system 20 is also configured to control the pitch of the blades 5 through a blade pitch adjustment system comprising a pitch control module 24 and a pitch actuation module 26.

It should be noted at this point that the architecture of a wind turbine speed control system that acts through power electronics such as a frequency converter to control generator torque and also acts through a pitch control system to control the pitch angle of the blades is generally known in the art, so only an overview of the functionality will be provided here.

The speed controller 22 receives a plurality of control inputs, but two input parameters are referred to specifically here: a rotor speed input parameter which is provided by a suitable rotor speed sensing means 23, and a demanded power input parameter or 'power reference' which is provided by a higher level controller 25 of the wind turbine system 2 either directly to the speed controller 22 or through a data distribution network based on a suitable protocol, such as Ethernet.

The speed controller 22 is operable to control the generator torque by outputting a demanded torque signal $T_{DEM}$ to the frequency converter 14, more specifically a control module operatively linked to the converter 14, during below-rated power operating condition in order to minimise the error between the rotor speed input parameter and the speed reference and, thus, to bring the generated power to match the power reference. Similarly, at operating conditions above-rated power, the speed controller 22 is operable to hold the generator torque constant but to provide a control input to the pitch control module 24 to modulate, collectively, the pitch angles of all three blades 5 of the rotor 4.

The pitch control module 24 receives the control input from the speed controller and converts this into a pitch angle adjustment value for each of the blades 5. These control inputs are fed to the pitch actuation module 26 which controls the pitch actuating motors for the respective blades 5.

Although in the above embodiment, the speed controller 22 is described as providing a demanded torque value to the frequency converter, it is also possible for the speed controller to provide the frequency converter with a demanded power reference, whereby the speed controller would calculate the torque necessary to apply to the gearbox in order to match the energy output to the demanded power reference.

As will be appreciated from the above discussion, the wind turbine system 2 is provided with a facility to control the rotor speed during a wide range of wind speed in order to optimise the power generation of the system. However, during operation it is well understood that the tower tends to oscillate with a side-to-side motion. To address this issue, the control system 20 includes a damping controller 28 which cooperates with the speed controller 22 and the pitch control module 24, as will be explained, in order to counter the oscillation of the tower 3.

At this point it should be noted that although the systems 22, 24, 28 have been described as being separate; this is not intended to confer a particular physical structure on the modules. For example, the modules may be separate firmware units or they may be individual functional software units implemented on a common processing platform.

Turning once again to FIG. 2, the operations of the active damping controller 28 will now be described in more detail. The active damping controller 28 functions to damp the oscillations of the tower in directions that are both lateral and in line with the rotor axis; that is to say the 'fore-aft' and 'side-to-side' motions of the tower, respectively. In order to do this, the controller 28 receives a sensor signal from a tower motion sensor 30.

The tower motion sensor 30 is an accelerometer which is configured to measure the axial and lateral acceleration of a suitable point or points on the wind turbine. Typically such a sensor will be mounted toward the top of the tower 3, and possibly in the nacelle 7, in order to maximise the accelerations to which it is subjected. In this way, the accelerometer is configured to detect the 'fore-aft' and 'side-to-side' motion of tower 3 of the wind turbine system 2. In particular, the accelerometer is configured to detect vibrations that are less than 15 Hz, more particularly less than 10 Hz or 5 Hz.

The benefit of using an accelerometer rated to detect vibrations below 15 Hz is that such sensors are relatively low cost compared to sensors that are rated to detect much higher frequencies, for example 5 kHz. Component costs are an important consideration when designing a wind turbine system. It is therefore necessary to choose components that are cost effective and yet provide satisfactory results. In this case, a 15 Hz motion sensor is capable of measuring the typical motion of a wind turbine system 2 when it is operating under normal conditions.

Due to small yet significant differences in the distribution of the mass of the rotor 4, caused by, for example, suboptimal weight distribution of the rotor 4. The rotation of the rotor 4 can cause very low frequency oscillations of the tower 3 in both a fore-aft and side-to-side motion. Such oscillations do substantially affect the operation of the wind turbine system 2 during normal operating conditions however, at higher rotor speeds (also known as '1P' in the art), the oscillations can cause fatigue to the wind turbine components.

If during operation of the wind turbine, it is determined that the rotor speed is not within a predetermined speed range the control system 20 activates the active damping controller 28 in order to actively damp the oscillations of the tower. Put another way the active damping controller 28 is operable during above-rated power operating conditions to damp the oscillatory motion of the tower. The active damping controller 28 also operates via the pitch control module 24 to control the pitch adjustment commands for the blades 5, as will now be explained.

In response to an input signal from the tower motion sensor 30 that is indicative of an enhanced fore-aft oscillation of the tower 3, the active damping controller 28 calculates the torque offset that is required to cause the rotor to apply a force to the nacelle that is counter to the detected fore-aft motion. The active damping controller is then operable to output a torque offset signal $T_{OFFSET}$ which serves to modulate the output of the speed controller 22. The modulated output signal $T_{DEM}$ is coupled to the frequency converter 14 by the speed controller 22, which then controls the generator 12 accordingly to counteract the measured tower oscillation.

In response to an input signal from the tower motion sensor 30 that is indicative of an enhanced side-to-side oscillation of the tower 3, the active damping controller 28 calculates a collective pitch change that is required to cause the rotor to apply a force to the nacelle that is counter the side-to-side motion. The active damping controller 28 is operable to output a pitch offset signal $P_{OFFSET}$ which serves to modulate the output of the pitch control module 24. The modulated signal is coupled to the pitch actuator 26, via a pitch controller 24, which then adjusts the pitch of the blades 5 accordingly.

The above discussion has explained the functionality of the active damping controller 28 to modulate the torque demand to the generator and also the pitch of the blades 5 in order to reduce oscillation of the tower. Such functionality is generally known and so only an overview is given here.

During operation of the wind turbine it is a common for the nacelle 7 to be rotated around the vertical axis of the tower 3 so as to face the rotor into the wind. This yawing of the nacelle 7 with respect to the tower 3 can produce high frequency vibrations caused by friction between the opposing surfaces of the tower and nacelle as they slide relative to one another. Such vibrations can be particularly problematic if there is insufficient lubrication between the sliding surfaces.

It has been observed that the high frequency vibrations can have the effect of saturating the motion sensor 30 output and cause signal aliasing so that the low frequency side-to-side oscillations of the tower are difficult to detect accurately. If the tower motion cannot be interpreted accurately using the signal from the sensor 30, then there is a risk that the motion damping functionality will not perform as effectively as it is designed to.

To address this problem, the wind turbine system 2 of the illustrated embodiments further includes a diagnostic system 31 including a diagnostic module 32, which is configured to receive sensor signals from the motion sensor 30 over time, and generate an error signal in dependence on the validity of the signal data. In this way, the diagnostic module 32 is configured to detect improper or misleading tower motion sensor readings which may stem from, for example, the vibrations caused due to the poor lubrication of the yaw sliding surface. The diagnostic system 31 further comprises an error handling module 34, which is configured to trigger an error handling event in dependence on receiving an error signal from diagnostic module 32.

The diagnostic module 34 is configured to analyse the tower motion sensor signal to identify frequency content, including one or more frequency components, that is not associated with the side-to-side oscillation of the tower. The diagnostic module 32 is able to then correlate the identified frequency content with the operation of the yaw system in order to determine that the yaw system requires lubrication. This diagnostic, or sensor validation, process may be achieved in numerous ways, and the discussion that follows explains one technique in detail.

In one embodiment, the diagnostic module 32 may be configured to implement a statistical change detection algorithm in order to analyse the tower motion signal. A mean value is calculated by averaging the tower motion signal over a pre-determined averaging window. The tower motion signal is then analysed to detect changes in the mean value from an idealised mean value.

In alternative embodiments, the diagnostic module 32 may be operable to implement a power spectrum analysis algorithm to analyse the tower motion signal, so as to identify increases in power at one or more frequencies of interest, which are indicative of lack of lubrication of the yaw system. In such a technique, a known fast Fourier transform (FFT) technique could be applied to the tower motion signal in order to split the frequency content of that signal into its individual frequency components. Suitably identification of frequency components that are not attributable to the side-to-side oscillation of the tower may thus be used to determine that the yaw tower system is insufficiently lubricated leading to undesirable vibrations through the structure of the tower.

Thus, if the frequency of the detected vibrations increases this is an indication to the wind turbine system operator that the yaw sliding surface needs lubricating. Alternatively it could indicate that for a particular wind turbine system, the yaw sliding surface requires a more comprehensive maintenance regime to prevent further unwanted vibrations in the future.

It will be appreciated that the diagnostic module 32 could be used to determine the validity of the motion sensor signals that are indicative of a variety of different ranges of tower motion. It is a particular advantage of the invention to analyse the motion sensor signals that represent the side-to-side motion, which are particularly relevant to the efficient operation of the wind turbine system 2.

Figure 3:
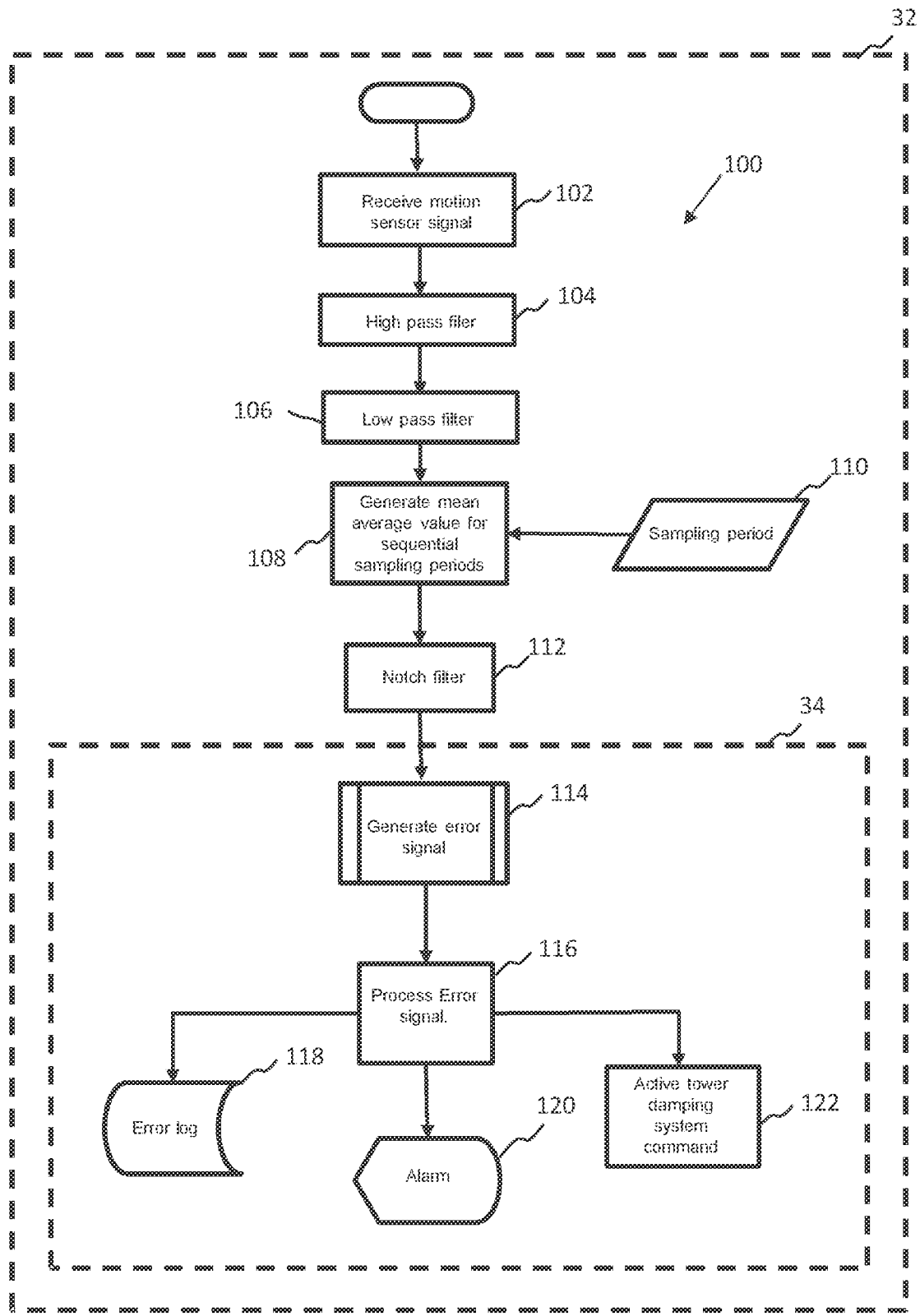
FIG. 3 is a process diagram illustrating a strategy for validating the signals that are output from a motion sensor of the wind turbine system.

The operation of the diagnostic module 32 will now be described in more detail. FIG. 3 illustrates a diagnostic strategy or process 100 that is implemented by the diagnostic system 32 in accordance with an embodiment of the invention.

The diagnostic strategy 100 begins at step 102 which corresponds to receiving the raw un-attenuated tower motion sensor signal from the tower motion sensor 30. The signal is indicative of the acceleration of the tower due to side-to-side tower oscillations.

The raw motion sensor signal is then passed through a high-pass 104 and/or a low-pass 106 filter. It will be appreciated by the skilled person that the motion sensor-signal may be modified and modulated in any number of ways according to common practice with handling signals produced from a tower motion sensor arrangement as described herein.

At step 108, the diagnostic module 32 monitors the signal by sampling the signal over a pre-determined averaging window, or sampling window 110, much like a 'rolling average' function, and generates a mean value for each sequential averaging window 110. The sampling rate of the signal is dependent on the application for which the accelerometer is used for. An example of a suitable averaging window is 0.02 s (i.e. sampling rate of 50 Hz).

Although the averaging window 110 may be configured as necessary for the particular application, in the illustrated embodiment the averaging window 110 may be set as equal to the tower oscillation period, that is to say, the reciprocal of the tower oscillation frequency. The tower oscillation frequency is defined as the natural vibration frequency of the combined tower and head mass (i.e. including the nacelle) of the wind turbine. According to the embodiment of the invention the number of tower cycles used to calculate the averaging window 110 is set to one, in order to limit the detection delay that would otherwise result from averaging over multiple tower cycles. The natural tower vibration frequency of a typical utility scale wind turbine, during normal operation, is 0.2 Hz.

At step 112, the average mean values are then passed through a notch filter 114. The notch filter is a band-stop filter, which allows some frequencies to pass through unaltered but attenuates values having frequencies in a specific range to a very low level. In this way the mean values that are associated with the normal operation of the wind turbine are largely removed from the analysis leaving behind only the mean values that are representative of the tower motion sensor signal which is caused by non-standard events, such as the vibrations produced by the yawing of the nacelle with respect to the tower.

The notch filter is a tuneable electronic filter, which is configurable to tune out frequencies from the sensor signal that are not of interest. For example, a notch frequency may be centred on the natural tower vibration frequency, whilst the gain and shape of the notch filter can be set to control how sharp the cut-off is between the unaltered and attenuated frequencies.

In particular, the notch filter is used to remove oscillations from the data that are likely to have resulted from external factors that the validation module is not concerned with, such as the effects of the wind and waves hitting the turbine tower. It has been shown that the sensor mean value and the variance of the mean value both increase linearly with the wind speed. Therefore, the notch filter is used to modulate (or flatten out) this correlation within the data so that it cannot obscure the effect of the high frequency vibrations on the signal. In other words, the notch filter is able to extract the high frequency 'noise' from the motion sensor data so that it can be effectively analysed by the diagnostic module 32.

At step 114, the diagnostic module 32 implements a diagnostic or error-generating strategy 114, which is used to decide whether or not an error signal should be generated. In this embodiment, the error-generating strategy 114 utilises a Cumulative Summation (CUSUM) algorithm to determine the variance of each averaged signal value, with respect to a nominally idealised mean value. Statistical methods such as CUSUM are well known in the art and as such it would be clear to the skilled person that similar statistical methods could be used to perform the variance analysis including, for example, a generalised likelihood ratio test (GLRT).

By analysing the tower motion sensor signal in this way, the invention is able to identify when the lower frequency vibrations, associated with the natural oscillation of the tower, are being masked or aliased by high frequency vibrations corresponding to the vibrations caused by the yawing the nacelle 7 with respect to the tower 3. In this way, the invention is able to detect aberrations in the side-to-side motion of the tower 3. This is particularly useful where there is a requirement to use low-cost accelerometers that may have limited sensitivity. For example, a tower accelerometer that has a frequency sensitivity of 15 Hz, more particularly 10 Hz or even 5 Hz may be more susceptible to aliasing than a sensor that has a frequency sensitivity of 5-10 kHz. However, the invention is able to interpret the high frequency signals at the low frequency range, thereby enabling it to operate using a less sensitive sensor.

Figure 4:
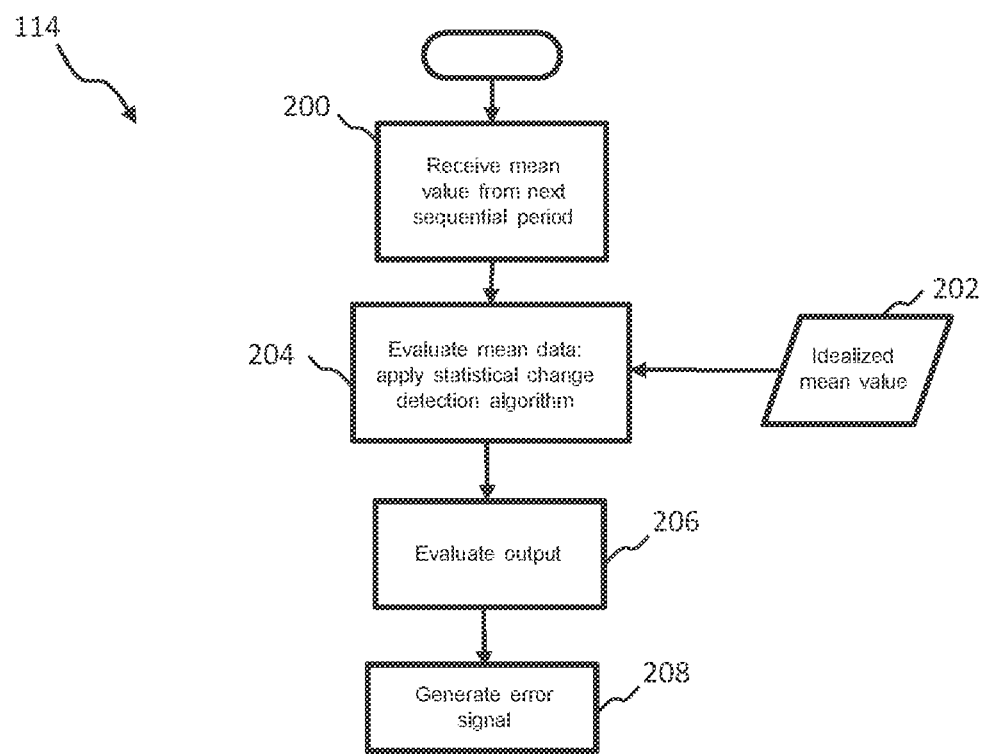
FIG. 4 is a process diagram illustrating a strategy for generating an error signal as part of the validation strategy shown in FIG. 3.

The processing steps that are undertaken as part of the error-generating strategy 114, as described in FIG. 4, start at step 200 in which a scalar value is received from the notch filter 112.

In the illustrated embodiment, a suitable statistical change detection algorithm is implemented (block 204). This algorithm may be the Cumulative Sum (CUSUM) algorithm as mentioned above. As is known, such an algorithm is designed to detect variations in the measured mean value that are greater than a predefined 'faulty' mean whilst taking into account an allowed or permitted signal variance.

As is known in the art, the CUSUM algorithm may be expressed as:

$$s[n] = \frac{\mu x_1 - \mu x_0}{\sigma_x^2}\left(x[n] - \frac{\mu x_1 + \mu x_0}{2}\right).$$

where:
  x[n] is the current mean sample
  x0 is the idealised mean value
  x1 is the predetermined 'faulty' mean value, which is defined as the mean value that is indicative of a problem with the yaw system, in this specific embodiment,
  $\sigma^2$ is the permitted or 'expected variance of the idealised mean that could be expected in a 'good' signal.
  s[n] is the likelihood ratio So, in summary, the diagnostic module 32 determines the difference between the received mean value from an idealized mean value 202, less the 'faulty' mean value, divided by the permitted variance. The difference between the received mean value (that is to say, the 'faulty mean') and the idealized mean value is then scaled by a fixed gain function of the faulty mean and the idealized mean divided by the permitted variance. The resulting value is then added to value determined in the previous iteration which provides a cumulative likelihood ratio.

According to this embodiment of the invention, the idealized value may be set to 0, which is representative of a perfectly symmetrical oscillation of the tower about its z-axis. Hence, any deviation of the tower's oscillatory motion from this symmetrical oscillation condition will be detected by the diagnostic module 32 when it exceeds a predetermined amount. The faulty mean value, which determines the sensitivity of the detection, may be set to any appropriate value, which, by way of example, may be 0.05. In this way, the diagnostic module 32 is tuned to distinguish mean values that represent the normal oscillatory conditions of the wind turbine from those that are representative of abnormal tower oscillations.

Whilst the likelihood ratio value is cumulated, it is evaluated (block 206) to determine whether it exceeds a predetermined threshold. If the cumulated likelihood ratio is found to exceed the predetermined threshold value, then an error signal will be generated (block 208).

Upon generation, the error signal is forwarded to the error handling module 34 of the diagnostic system 31. With reference to FIG. 3, the error handling module 34 is configured to trigger the error handling event in dependence on receiving the error signal. The error handling event can include one of a) logging the error signal (block 118), b) providing an alarm, for example to a power plant operator, or to a maintenance provider to identify a maintenance requirement, for example that the yaw system requires lubrication (block 120), and c) providing a deactivation command signal to the active damping controller 28 (block 122). In this way, the error handling module 34 provides a means for the diagnostic module 32 to operate in three different operation modes, namely; an error logging mode, a low-dependency maintenance mode, and a high-dependency operation mode.

In error logging mode, the issuing of error signals from the diagnostic module 32 are logged and stored on a removable memory storage device which can be accessed by a wind turbine operator for later analysis. The error logging mode allows for a wind turbine operator to observe the quality of the tower motion signals over time. This information could be used, for example, to study any potential correlation between tower motion signal quality and any of the operating parameters of the wind turbine system 2.

In maintenance mode, the error signal is transmitted to an alarm/alert of the wind turbine system 2. The alarm is activated in dependence on receiving the error signal and is configured to alert a wind turbine operative to the fact that the tower motion sensor is outputting erroneous or misleading sensor signals. The diagnostic module 32 thereby alerts the wind turbine operator i.e. an operator that is external to the wind turbine system itself, to the potential need to inspect the wind turbine, and in particular the lubrication of the yaw sliding interface. Conveniently, the diagnostic module 32 also allows for the operative to monitor the frequency with which error signals are generated, and then adapt a maintenance regime accordingly in view of the feedback from the diagnostic system, so as to compensate for the increased levels of lubrication that may be required.

In operation mode, the tower motion system deactivation command signal is sent to the active damping controller 28 of the wind turbine system 2 and is configured to deactivate the operations of the damping controller 28. In particular, deactivation command signal includes an instruction to impose a power derate command to the frequency converter 14 via the speed controller 22, which then controls the generator 12 accordingly. If the diagnostic module 32 determines that the tower motion signals are likely to mislead the active motion damping controller 28 into controlling the wind turbine such that it may cause damage to the power components, then the diagnostic module 32 may be configured to issue the command signal to the active damping controller 28 in order to prevent any damage from being caused. In this way, the diagnostic module 32 is able to indirectly affect the operation of the wind turbine through the operation of the active motion damping controller 28.

The cumulative threshold value may be selected depending on the nature of the error handling event that may be triggered by the error handling module. For example, a high cumulative threshold value is likely to take a long time to trigger the generation of an error signal as it will require the accumulation of a relatively large number of erroneous average mean values in order to exceed the cumulative threshold value. However, the high cumulative threshold value is also likely to reduce the likelihood of generating a false alarm. For this reason, a relative high threshold value is selected for the low-dependency maintenance mode, where there is no need to act quickly to any given alarm but where false alarms will not be tolerated. The cumulative threshold value may be set to a value of 50 when operating in the low-dependency maintenance mode, by way of example.

By contrast, when operating in the high-dependency operation mode, the detection of a misleading motion sensor signal needs to be transmitted quickly so that action can be taken to mitigate any potential risk to the wind turbine components. In order to achieve this, a relatively high likelihood of receiving a false alarm can be tolerated. In such a situation, the cumulative threshold value may be set to a value of 5 when operating in the high-dependency operation mode, which it should be noted is an order of magnitude less than the threshold in the low-dependency maintenance mode.

The error handling module 34 is further configured to artificially maintain the error signal for a predetermined holding period, in order to prevent 'flickering' of the error signal which could cause the signal to be missed or misinterpreted. According to the embodiment the holding period is proportional to the reciprocal of the tower's natural oscillation frequency, that is to say, the holding is based on the oscillation period of the tower. In this way it can be ensured that the generation of an error signal will be registered as a trigger for an error handling event to occur.

The skilled person would understand that variations could be made to the embodiments discussed above without departing from the inventive concept as defined by the claims.

In the illustrated embodiments described, the wind turbine system 2 comprises a a control system 20 which works in conjunction with the diagnostic system 31. The control system 20 co-operates with the diagnostic system 31 because it needs to effectively interpret the motion signals indicative of the tower oscillation, in order so that it can safely damp the motion of the tower without causing damage to any of the tower's constituent components. However, embodiments are also envisaged that do not include a a control system 20 wherein the diagnostic module 31 is operable on its own.

The invention claimed is:

1. A system for use in a yaw system of a wind turbine, comprising:
   a tower motion sensor configured to measure an oscillation of a tower and output a signal corresponding to the measured oscillation; and
   a module configured to:
      identify, via a statistical change detection algorithm applied to the signal, frequency content that is not associated with a natural frequency of the tower, wherein the frequency content is identified by:
         generating mean values of the signal based on sequential averaging windows,
         comparing the mean values to an expected value of the signal, wherein the expected value is based on the natural frequency of the tower,
         determining a result value based on the comparison between the mean values and the expected value, and
         generating an error signal based on the result value exceeding a predetermined threshold value; and
      correlate the identified frequency content with an operation of the yaw system to determine that the yaw system requires maintenance.

2. The system of claim 1, wherein the module is further configured to:
   identify a first portion of the frequency content that is indicative of the natural frequency of the tower and a second portion that is indicative of the operation of the yaw system; and
   generate an error signal based on the identification of the second portion of the signal,
   wherein the second portion of the frequency content has a frequency that is outside a sensitivity range of the tower motion sensor.

3. The system of claim 1, wherein the system further comprises an error handing module configured to trigger an error handling event upon receiving the error signal, wherein the error handling event comprises performing at least one of: a) logging the error signal, b) providing an alert to an external operator, and c) deactivate a tower motion damping system of the wind turbine.

4. The system of claim 3, wherein the predetermined threshold value is selected based on the error handling event.

5. The system of claim 1, wherein the module implements a power spectrum analysis algorithm to analyze the signal, so as to identify increases in power at one or more frequencies of interest that are indicative of a lack of lubrication of the yaw system.

6. The system of claim 1, wherein the system is further configured to maintain the error signal for a predetermined holding period.

7. The system of claim 6, wherein the predetermined holding period is based on an oscillation period of the tower.

8. The system of claim 1, wherein the tower motion sensor is an accelerometer.

9. The system of claim 8, wherein the accelerometer is configured to detect vibrations below a frequency of 15 Hz.

10. A wind turbine system comprising:
    a tower,
    a nacelle disposed on the tower,
    an electrical generator disposed in the nacelle and operatively coupled to a rotor having a plurality of blades,
    a rotor blade pitch controller system,
    a generator torque controller,
    an active tower damping system configured to apply damping control inputs to at least one of the rotor blade pitch controller system and the generator torque controller of the wind turbine system,
    a yaw system configured to control a yaw of the nacelle;
    a tower motion sensor configured to measure a tower oscillation and output a signal corresponding to the measured tower oscillation, and
    a module configured to:
       identify, via a statistical change detection algorithm applied to the signal, frequency content that is not associated with a natural frequency of the tower, wherein the frequency content is identified by:
          generating mean values of the signal based on sequential averaging windows,
          comparing the mean values to an expected value of the signal, wherein the expected value is based on the natural frequency of the tower,
          determining a result value based on the comparison between the mean values and the expected value, and
          generating an error signal based on the result value exceeding a predetermined threshold value; and correlate the identified frequency content with an operation of the yaw system to determine that the yaw system requires maintenance.

11. The wind turbine system of claim 10, wherein the module is further configured to:
   identify a first portion of the frequency content that is indicative of the natural frequency of the tower and a second portion that is indicative of the operation of the yaw system; and
   generate an error signal based on the identification of the second portion of the signal,
   wherein the second portion of the frequency content has a frequency that is outside a sensitivity range of the tower motion sensor.

12. The wind turbine system of claim 10, wherein the system further comprises an error handing module configured to trigger an error handling event upon receiving the error signal, wherein the error handling event comprises performing at least one of: a) logging the error signal, b) providing an alert to an external operator, and c) deactivate the active tower damping system.

13. The wind turbine system of claim 12, wherein the predetermined threshold value is selected based on the error handling event.

14. A method, comprising:
   measuring, via a tower motion sensor, a tower oscillation of a tower of a wind turbine system, and outputting a signal corresponding to the measured tower oscillation;
   identifying, via a statistical change detection algorithm applied to the signal, frequency content that is not associated with a natural frequency of the tower, wherein the frequency content is identified by:
      generating mean values of the signal based on sequential averaging windows,
      comparing the mean values to an expected value of the signal, wherein the expected value is based on the natural frequency of the tower,
      determining a result value based on the comparison between the mean values and the expected value, and
      generating an error signal based on the result value exceeding a predetermined threshold value; and
   correlating the identified frequency content with an operation of a yaw system to determine that the yaw system requires lubrication.

15. The method of claim 14, further comprising:
   identifying a first portion of the frequency content that is indicative of the natural frequency of the tower and a second portion that is indicative of the operation of the yaw system; and
   generating an error signal based on the identification of the second portion of the signal, wherein the second portion of the frequency content has a frequency that is outside a sensitivity range of the tower motion sensor.

16. The method of claim 14, further comprising triggering an error handling event upon receiving the error signal, wherein the error handling event comprises performing at least one of: a) logging the error signal, b) providing an alert to an external operator, and c) deactivate a tower motion damping system of the wind turbine system.

* * * * *